United States Patent
Pleshek et al.

(10) Patent No.: US 11,783,144 B2
(45) Date of Patent: *Oct. 10, 2023

(54) MOBILE RFID CONTAINER AND DISTRIBUTION METHOD

(71) Applicant: Promega Corporation, Madison, WI (US)

(72) Inventors: Joseph Pleshek, Cambridge, WI (US); Brian George, Brodhead, WI (US); Travis Phillips, Stoughton, WI (US); Mark Sehmer, Stoughton, WI (US)

(73) Assignee: Promega Corporation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,289

(22) Filed: Jun. 20, 2019

(65) Prior Publication Data

US 2019/0303633 A1 Oct. 3, 2019

Related U.S. Application Data

(63) Continuation of application No. 15/581,818, filed on Apr. 28, 2017, now abandoned, which is a (Continued)

(51) Int. Cl.
*G06K 7/10* (2006.01)
*G06Q 10/08* (2023.01)
(Continued)

(52) U.S. Cl.
CPC ......... *G06K 7/10366* (2013.01); *G06F 21/35* (2013.01); *G06Q 10/08* (2013.01);
(Continued)

(58) Field of Classification Search
CPC ............ G06F 21/35; G06F 2221/2121; G06K 7/10366; G06Q 10/08; H04W 4/008; H04W 4/021; H04W 4/04
(Continued)

(56) References Cited

U.S. PATENT DOCUMENTS 5,588,483 A * 12/1996 Ishida .................. F28D 15/02
165/104.33
2002/0183882 A1* 12/2002 Dearing ............. G06K 7/10336
700/115
(Continued)

FOREIGN PATENT DOCUMENTS

| EP | 2416298 A2 | 2/2012 |
| WO | 2005111961 A1 | 11/2005 |
| WO | 2008033340 A2 | 3/2008 |

OTHER PUBLICATIONS

Supplementary European Search Report, International Application No. 14829454.9-1870, dated Mar. 6, 2017 (9 pages).
(Continued)

*Primary Examiner* — Yong Hang Jiang
(74) *Attorney, Agent, or Firm* — McAndrews, Held & Malloy, Ltd.

(57) ABSTRACT

A transportable container is enabled with radio frequency identification ("RFID") technologies to maintain automated inventory levels of those items that are inside the container. The inventory data is communicated via wireless methods, such as cellular or Wi-Fi, to a remote device such as enterprise resource planning ("ERP") system. The ERP system may use the inventory data received from the remote device to automatically update appropriately and generate appropriate records (e.g., container inventory, restocking, invoicing, etc.). In some embodiments, automated RFID scans are triggered when the container is opened and subsequently closed. The container may include RF contain- (Continued)

ment/screening to prevent inadvertent scanning of RFID tags outside of the container. The container may also include a location device to allow the location of the container to be readily determined.

16 Claims, 4 Drawing Sheets

Related U.S. Application Data continuation of application No. 14/337,732, filed on Jul. 22, 2014, now Pat. No. 9,704,000.

(60) Provisional application No. 61/857,987, filed on Jul. 24, 2013.

(51) Int. Cl.
| | |
|---|---|
| *G08B 13/24* | (2006.01) |
| *G07G 1/00* | (2006.01) |
| *H04W 4/021* | (2018.01) |
| *H04W 4/80* | (2018.01) |
| *G06F 21/35* | (2013.01) |
| *H04W 4/029* | (2018.01) |
| *G06Q 10/087* | (2023.01) |
| *G08B 13/08* | (2006.01) |
| *H04W 4/30* | (2018.01) |
| *H04W 4/40* | (2018.01) |

(52) U.S. Cl.
CPC ........... *G06Q 10/087* (2013.01); *G07G 1/009* (2013.01); *G08B 13/2417* (2013.01); *H04W 4/021* (2013.01); *H04W 4/029* (2018.02); *H04W 4/80* (2018.02); *G06F 2221/2121* (2013.01); *G08B 13/08* (2013.01); *H04W 4/30* (2018.02); *H04W 4/40* (2018.02)

(58) Field of Classification Search
USPC .............................................. 340/5.73, 10.31
See application file for complete search history.

(56) References Cited

U.S. PATENT DOCUMENTS

| | | | |
|---|---|---|---|
| 2003/0100305 A1* | 5/2003 | Parisi | G08G 1/202 |
| | | | 455/435.1 |
| 2004/0196182 A1* | 10/2004 | Unnold | G08B 21/0269 |
| | | | 342/357.25 |
| 2006/0207916 A1* | 9/2006 | Mimura | G03F 1/66 |
| | | | 206/710 |
| 2008/0030345 A1 | 2/2008 | Austin et al. | |
| 2008/0186163 A1* | 8/2008 | Mills | G01S 19/16 |
| | | | 342/357.54 |
| 2008/0297310 A1 | 12/2008 | Onderko | |
| 2008/0309487 A1* | 12/2008 | Chao | G08B 13/06 |
| | | | 340/542 |
| 2012/0112902 A1* | 5/2012 | Meyers | |
| 2012/0235791 A1* | 9/2012 | Donlan | G06Q 10/0833 |
| | | | 340/10.1 |
| 2013/0106607 A1 | 5/2013 | Clement et al. | |
| 2019/0172331 A1* | 6/2019 | Hall | G06K 7/10445 |

OTHER PUBLICATIONS

Supplementary European Search Report, International Application No. 14829454.9-1870, dated Mar. 17, 2017 (1 page).
Supplementary European Search Report, International Application No. 14829454.9-1870, dated Mar. 23, 2017 (81 page).
Communication pursuant to Article 94(3) EPC, International Application No. 14829454.9-1870, dated Feb. 13, 2019 (4 pages).

\* cited by examiner

MOBILE RFID CONTAINER AND DISTRIBUTION METHOD

RELATED APPLICATIONS

This application is a continuation of U.S. application Ser. No. 15/581,818 filed Apr. 28, 2017, which is a continuation of U.S. application Ser. No. 14/337,732, filed Jul. 22, 2014, and issued as U.S. Pat. No. 9,704,000 on Jul. 11, 2017, which claims priority to U.S. Provisional Application No. 61/857,987 filed Jul. 24, 2013. The above-identified applications are hereby incorporated herein by reference in their entirety.

BACKGROUND

The present technology relates generally to supply chain management, including the distribution, tracking, transport, storage and inventory systems, as well as methods utilized to perform such supply chain management. Radio frequency technologies, cellular communication systems, global positioning systems, and software workflow applications involved with supply chain management are also disclosed.

Currently, in the healthcare industry, complex and expensive medical devices, such as implantable devices, and related instruments are distributed from the medical device manufacturer or distributor to the healthcare provider (e.g., hospital or surgical center). These devices are typically packaged in sterilized containers and organized, for example, by type of medical procedure and/or size. In many cases, until the medical procedure is actually in process, it is unclear from an inventory and logistics standpoint as to what exact medical device(s) and/or instrument(s), e.g., size or type, will be used in the particular procedure. Because of this, it is necessary for the medical device manufacture to provide a substantial (yet constantly changing) inventory of medical devices, e.g., various types and sizes, as well as related instruments, to the medical facility, e.g., hospital or surgical center, at a relatively short notice.

One method to accomplish this is to distribute an inventory of medical devices from the manufacturer or distribution center to the medical facility in a transportable container. These containers are stocked with items, e.g., product(s) at a manufacturer or distribution center and may sit in inventory until a specific customer or sales representative requests them for use.

For example, once there is a request for a certain devices, e.g., a set of implant/device, a container is labeled and shipped, e.g., via Federal Express, UPS, or another courier, to the medical facility, (or directly to a medical device field representative who will, in turn, transport it to the medical facility). Once in the medical facility, the container is opened and various devices are removed (some of which are used in a medical procedure, e.g., implanted into a patient). When the procedure is complete, the container is packaged up and returned to the medical device manufacturer or distribution center.

Currently, there is very little visibility into what inventory is actually in a container at any given time. It is only when the manufacturer or distribution center receives the container back and opens it that they actually know what items were taken or used in a given procedure. As these containers need to be quickly restocked and sent back out for use in other procedures, the manufacturer or distribution center can be caught without enough inventory of a particular device or implant type or size because they only see what has been taken and used when the container is physically (over the course of days to weeks) returned. Additionally, if a particular procedure is not performed for an extended period of time following delivery of the container to the medical facility, the associated transportable container and its expensive medical device/implant inventory cannot be further tracked and managed in a "real-time" manner. Thus, the manufacturer may end up producing a significant amount of device/implant overstock because of the poor logistical controls. Moreover, if the container is not returned to the distribution for restocking following a procedure, the container may not include the appropriate inventory for a subsequent procedure. In some instances, this out of stock condition may not be discovered until after the subsequent procedure has begun.

In addition, the physical location of each container is often unknown, leading to wasted time by the medical device manufacturer and/or medical facility staff having to track down each container. In such instances, the medical device manufacturer may need to stock additional devices and containers to offset containers unaccounted for devices and containers.

Furthermore, the medical device manufacture cannot invoice the customer until it confirms what has been used in a particular procedure. At times, the container will not be returned to the manufacturer or distribution center for days after a procedure, which can lead to billing delays and inaccuracies.

SUMMARY

At least some embodiments of the present technology depicted herein relate to a transportable container enabled with radio frequency identification ("RFID") technology to maintain automated and "real time" inventory levels of the items that are inside the container. In some embodiments, the transportable container may, for example, be in the form of a mobile container that is sized and configured to be transported, e.g., carried, by a person. In other embodiments, the container may, for example, be a cargo or a shipping container, a rail car, a vehicle, etc. The inventory data is communicated, e.g., via wireless methods such as cellular or Wi-Fi, to a remote device such as an enterprise resource planning ("ERP") system, website, server, personal computer, etc. The remote device may use the inventory data received from the transportable container to automatically update and generate appropriate records (e.g., container inventory, restocking, invoicing, etc.). In some further embodiments, automated RFID scans are triggered when the container is opened and subsequently closed. The container may include RF containment/screening to prevent inadvertent scanning of RFID tags outside of the container.

The container may also include a location device for determining the location of the container and its associated cargo. For example, the container may utilize cellular triangulation and/or global positioning system ("GPS") technology to allow for determining the location of the container. The container may also include a power source, such as a rechargeable battery power, for the electronics.

In some embodiments, the container may include additional sensors for monitoring environmental conditions, such as temperature, humidity, pressure, etc., of the interior compartment and/or the ambient conditions surrounding the container. Similarly, the container may be equipped with impact sensor(s), accelerometer(s) or similar technology for gathering data regarding impacts or other adverse forces that the container is exposed to, e.g., for introducing accountability and oversight into the shipping and handling stages of the supply chain.

The container may include a controller coupled to these sensors and configured to transmit data gathered by these sensors to a remote device. In some embodiments, the controller may be configured to transmit such data at predetermined time intervals and/or in response to predetermined events or conditions. For example, if the controller detects an event that could adversely affect the products, such as an excessive impact or adverse temperature condition, the controller may be configured to automatically transmit the relevant data to the remote device.

In addition, a mobile RFID container may include one or more visual and/or audible indicators that may be activated in response to the data collected from the sensors. For example, the container may include a visual indicator, such as a light, display screen, etc., that may be used to provide messages and/or alerts in response to the data collected from the various sensors. The container may also include a device such as a speaker for providing audible alerts and/or messages in response to the data collected from the various sensors.

The mobile RFID container may also include a communication interface configured to transmit data to the remote device. In some embodiments, the communication interface may be a wireless communication interface and may include, for example, one or more of a cellular interface, a Wi-Fi interface or a Bluetooth interface. Data, such as scan (i.e., RFID tag data), location, sensed parameter and/or time code data may be communicated to a remote device such as an enterprise resource planning ("ERP") system, website, server, personal computer, etc. The remote device may use the data received from the transportable container to automatically update and generate appropriate records (e.g., container inventory, restocking, invoicing, location tracking, breakage, tampering, container conditions, open and close events, etc.).

The mobile RFID container may further include radio frequency, ("RF") shielding to prevent the RFID scans from reading RFID tags located outside of the container. In some embodiments, the RF shielding may include one or more layers of RF blocking material that surrounds or lines the interior compartment. In some embodiments, the layer of RF blocking material comprises at least one of metal or metalized plastic. In some embodiments, the layer of RF blocking material comprises one of a sheet metal, a metal screen, or a metal foam. However, it should be appreciated that the RF shielding aspects and embodiments of the present technology may comprise any one or more suitable shielding materials beyond the ones noted here. If the material(s) can function as an RF shielding material, it/they are contemplated for use in accordance with the present technology and appended claims. In some embodiments, such RF shielding material may not be needed depending on antenna selection and/or RF power settings, for example.

In some embodiments, the RFID tagged items carried in the mobile RFID container may be one or more pharmaceuticals, biologics, medical devices and/or medical instruments. The scan data may include, for example, one or more of an EPC code, a TID code, a serial number, a product description, a date, and a lot number among others).

In some embodiments, the mobile RFID container may include a system for limiting and/or tracking access to the container. For example, in some embodiments, the mobile RFID container may include a locking mechanism and an identification sensor, such as a badge or card reader. The controller may be coupled to the identification sensor and locking mechanism and configured to track and/or restrict access to the container. For example, in some embodiments, the controller may be configured to record identity information regarding individuals who attempt to access contents of the container via the identification sensor and transmit such data to the remote device.

At least some embodiments of the present technology relate to a mobile RFID container for carrying a plurality of products that include respective RFID tags. The housing may include a main body and a door, lid or cover (collectively referred to herein as a "door"). The main body and the door cooperate to define an interior compartment configured to carry the plurality of products. The door is movable relative to the main body between an open position to provide access to the interior compartment and a closed position to prevent access to the interior compartment. In some embodiments, the door may be movably connected to the main body, e.g., by one or more hinges or similar mechanism. Alternatively, in some embodiments, the door may be completely removable from the main body. A door sensor may be provided to detect opening and closing of the door. An RFID detector may be positioned in the housing and configured to conduct an RFID scan of the interior compartment and collect scan data concerning the products contained within the compartment. A controller is communicatively coupled to the door sensor and the RFID detector. In some embodiments, the controller may be configured to trigger an RFID scan via the RFID detector in response to the occurrence of predetermined events and/or at regular time intervals. For example, the controller may be configured to trigger an RFID scan in response to the door sensor detecting that the door has been closed. The controller may further be configured to transmit the scan data to a remote device.

Certain embodiments of the present technology relate to a method for distributing a plurality of products, where each product includes at least one RFID tag. The method includes providing a mobile RFID container as described above; placing a plurality of products in the mobile RFID container; transporting the mobile RFID container to an end user; conducting an RFID scan in response to sensing the opening and closing of the door following the transporting step; and transmitting scan data collected via the RFID scan from the RFID container to a remote device. The method may further comprise generating inventory, invoicing and/or credit data based on the scan data. However, it should be appreciated by those skilled in the art that a variety of types of reports may be generated (e.g., time/date status report, location report, tamper event report, external/internal container conditions report, content conditions report, among others). In other embodiments, the inventory, invoicing and/or credit data, for example, may be generated by the remote device. The method may also include transporting the mobile RFID container from the end user to a manufacturer or distribution center and restocking the container with products. In some embodiments, the restocking is based on scan data transmitted by the mobile RFID container prior to the RFID container reaching the manufacturer or distribution center. Thus, at least one advantage of the present technology is real-time use and contents tracking and inventory management which, in turn, enhances billing and invoicing timing, efficiency and/or accuracy. In still further embodiments, an RFID scan may be automatically conducted when the container is closed following the restocking step. The scan data collected following the restocking step may be transmitted from the mobile RFID container to the remote device. The method may also comprise generating location data indicative of the location of the mobile RFID container and transmitting location data from the mobile RFID container to the remote device

DETAILED DESCRIPTION

Figure 1:
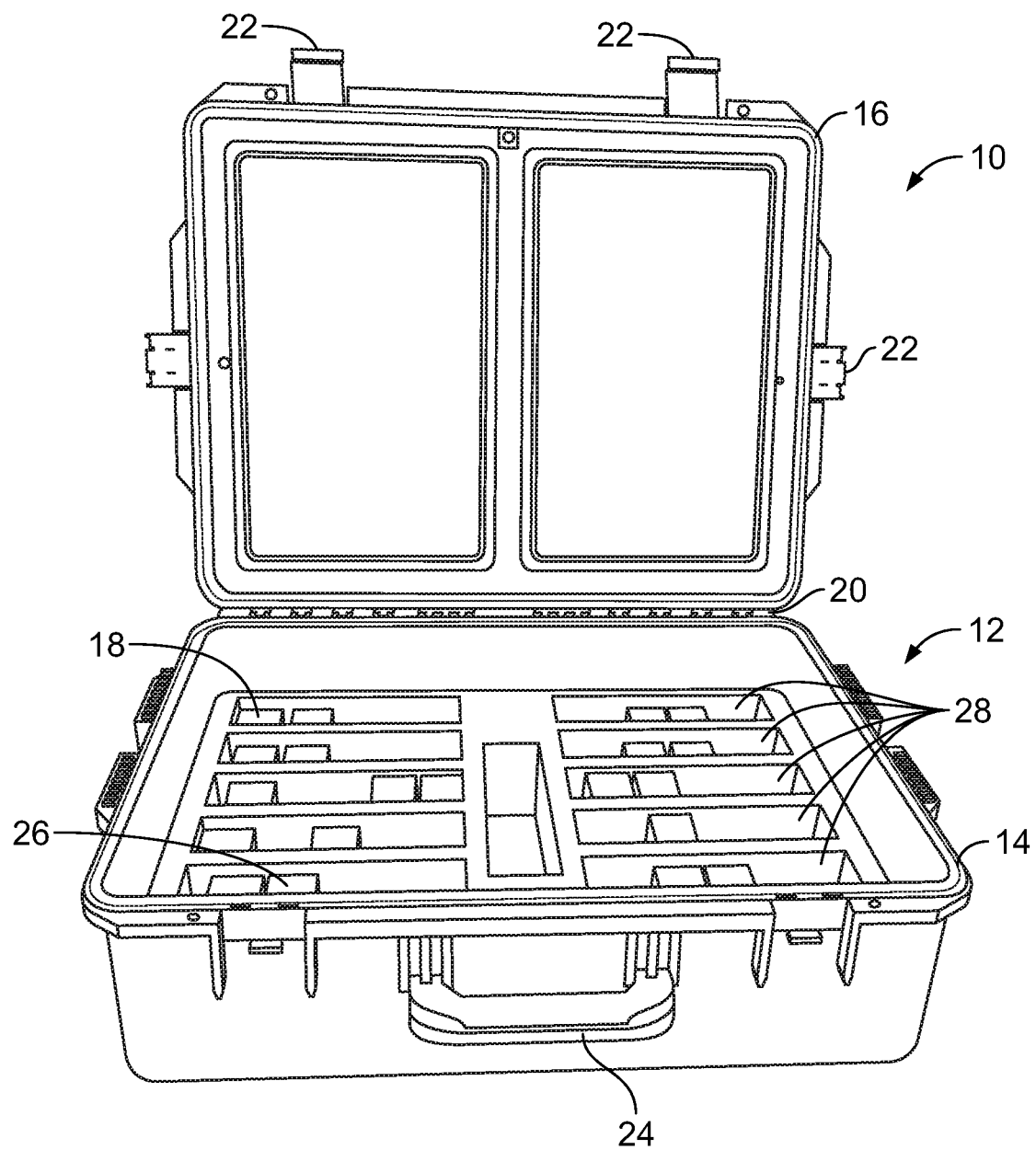
FIG. 1 is a perspective view of a mobile RFID container according to an exemplary embodiment of the present technology.

FIG. 1 illustrates a mobile (i.e., transportable or movable) RFID container 10 according to certain embodiments of the present technology. In the embodiment of FIG. 1, the mobile RFID container 10 is in the form of a container that is sized and configured to be transported, e.g., carried, by an individual. It will be appreciated, however, that the container can take numerous other forms, such as, a rail car, a cargo container, a shipping container, or a vehicle, for example.

In the illustrated embodiment, container 10 includes a housing 12 having a main body 14 and a door 16. The main body 14 and the door 16 cooperate to define an interior compartment 18. The door 16 is movable relative to the main body 14 between an open position to provide access to the interior compartment 18 and a closed position to prevent access to the interior compartment. In the illustrated embodiment, the door 16 is movably connected to the main body 14 by a hinge mechanism 20. Alternatively, the door 16 may be removable from the main body 14 in order to provide access to the interior compartment. The housing 12 may include one or more latches 22 for securing the door 16 in its closed position. The housing 12 may also include one or more handles 24 and/or wheels (not shown) to facilitate its movement.

The interior compartment 18 is configured to house a plurality of items 26. In this regard, the interior compartment may include a plurality of sub-compartments 28, each of which is configured to house one or more individual items. By way of example, the items 26 may include pharmaceuticals, biologics, medical devices, such as implants, and/or related medical instruments, e.g., surgical instruments. Each product (or its packaging) may include one or more RFID tags 30 (see FIG. 2) encoded with descriptive information for the respective product, such as an EPC code, a TID code, a serial number, a product type, a date, a lot number, and similar information, or a unique ID, among other information which can correspond to information in a database on a server. The sub-compartments 28 may be defined by a substantially RF transparent material, such as hard foam; plastic or rigid cardboard.

Figure 2:
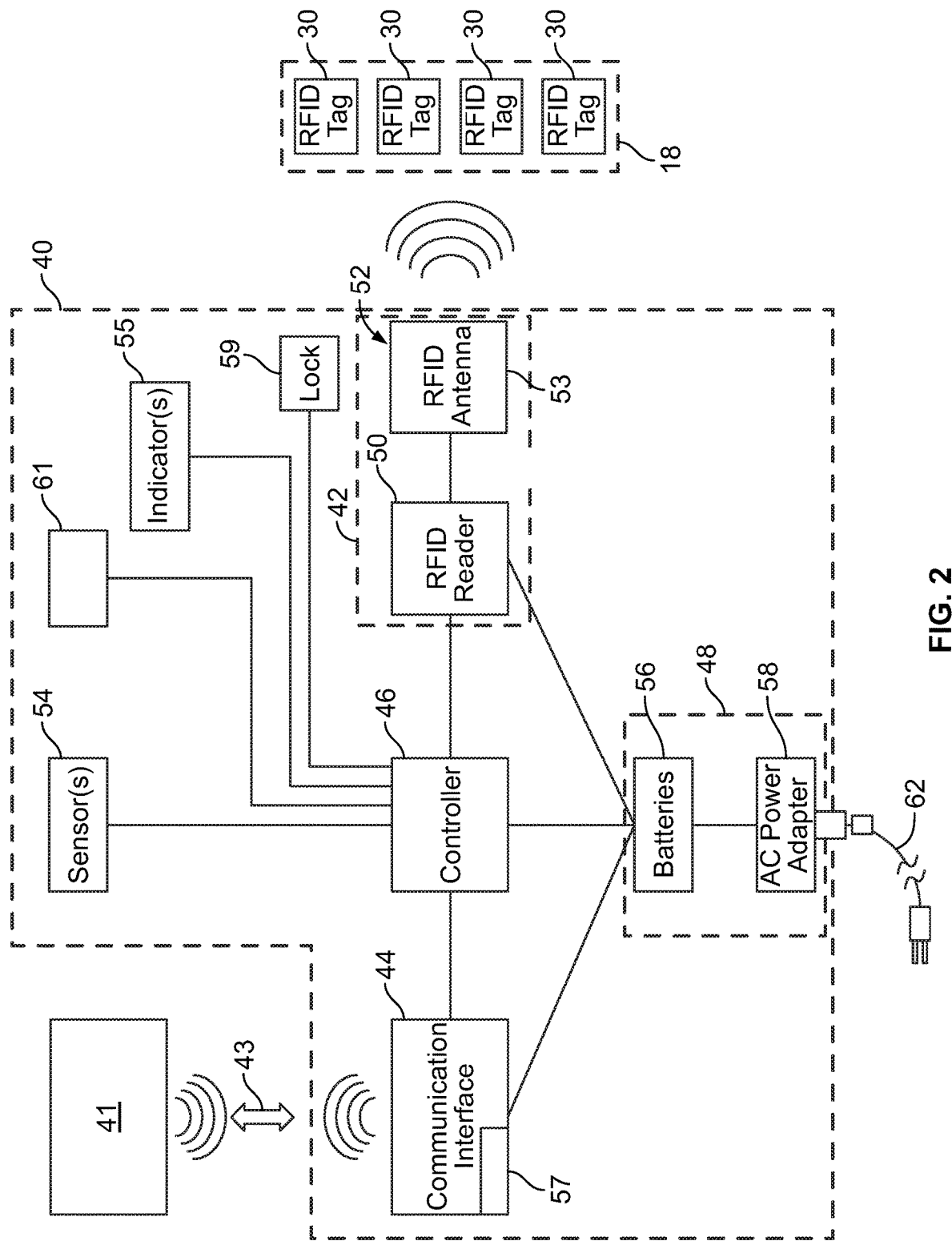
FIG. 2 is a schematic of a control system used in the mobile RFID container of FIG. 1.

Referring additionally to FIG. 2, the mobile RFID container 10 may also include at least one control system 40 for collecting data regarding the RFID-tagged items within the container and transmitting that data to a remote device 41 over a network 43. Transmissions between the mobile RFID container 10 and the remote device may be conducted using standard protocols such as TCP/IP, UDP, or other protocols. The network 43 may be the Internet, a telephone network, a wireless network, power line carrier ("PLC") network, or other type of network and combinations thereof. In some embodiments, the remote device 41 may be an enterprise resource planning ("ERP") system, website, server, personal computer, etc. In some embodiments, the remote device may include multiple servers and databases and be constructed in accordance with certain aspects of the systems described in U.S. Pat. Nos. 8,025,228 and/or 7,258,276, the disclosures of which are hereby incorporated by reference.

The control system may include an RFID detector 42, a communications interface 44, a controller 46 and a power source 48. The RFID detector 42 may be configured to conduct RFID scans of the interior compartment 18 and collect scan data concerning the RFID-tagged items 26 contained within the compartment. The RFID detector 42 may include at least one RFID reader 50 interconnected with at least one RFID antenna mechanism 52. In some embodiments, the RFID antenna mechanism 52 may include a plurality of antennas 53. The RFID tags 30 may be passive or active. In the case of passive tags, the RFID reader 50 may be operable to activate the antenna mechanism 52 such that the antenna mechanism emits at least one signal at a predefined frequency and generates an electromagnetic field sufficient to permeate the entire interior compartment. An RFID reader that is suitable for use in at least some embodiments is an Indy RS500 reader module, which is available from Impinj, Inc. Another suitable RFID reader for at least some embodiments is an Impinj Speedway Revolution RFID.

The communications interface 44 may be a wireless communications interface and may include one or more of a cellular interface, a Wi-Fi interface or a Bluetooth interface, for example. A wireless communications interface suitable for use in at least some embodiments of the present technology is a Sierra MC7354 with a SIM card provided by a carrier such as Sprint, Verizon or AT&T, which are available from commercial sources. Another suitable wireless communication interface for at least some embodiments is a Cradlepoint MBR1400 with a cellular data card. Alternatively or additionally, the communications interface 44 may include a wired network interface, such as a Ethernet NIC, for example.

The controller 46 is communicatively coupled to the RFID detector 42 and the communications interface 44, e.g., via Ethernet or other suitable connections. A suitable controller for use in at least some embodiments of the present technology is an Arcom Zeus embedded computer which is available from commercial sources. In some other embodiments, the controller may be embodied in a custom board. The controller 46 may be configured to trigger RFID scans via the RFID detector 42 and to transmit scan data to the remote device 41 via the communications interface 44. In some embodiments, the controller 46 may transmit the scan data to the remote device 41 each time an RFID scan is performed. In some embodiments, the controller may be configured to trigger one or more RFID scans in response to a scan request received from the remote device 41. In some embodiments, the controller 46 may be configured to trigger multiple scans. For example, the controller 46 may run a plurality of scans in order to ensure a predetermined integrity level of the scan data in the manner described in the aforementioned U.S. Pat. No. 8,025,288.

The control system 40 may also include one or more sensors 54 for detecting parameters relative to the mobile RFID container. For example, in some embodiments, the sensor(s) 54 may include a door sensor for detecting the position and/or movement of the door 16 and transmitting at least one signal indicative thereof. For example, the door sensor may be a proximity sensor that is configured to provide information regarding whether the door 16 is opened or closed. A sensor that is suitable for use in at least some embodiments is Omron Automation 3-wire E2E-X1R5E1 proximity sensor, which is available from commercial sources. As discussed below, the door sensor may be used to determine if the contents of the container have been accessed. As will be appreciated, a variety of other sensors, such as motion sensors, may alternatively or additionally be used to facilitate this function. For example, when the container is in the form of a truck or shipping container, a motion detection sensor may be provided to detect when individuals enter or exit the container.

In some embodiments, the sensor(s) 54 may include one or more sensors for monitoring environmental conditions, such as temperature, humidity, atmospheric pressure, etc., of the internal compartment and/or the ambient conditions surrounding the mobile RFID container 10. Similarly, in some embodiments, the sensor(s) 54 may include one or more impact sensors or similar technology for gathering data regarding impacts and/or other adverse forces that the mobile RFID container is exposed to.

The controller 46 may be operatively coupled to the sensor(s) 54 and configured to collect data from the sensor(s). In some embodiments, the controller 46 may be configured to perform additional actions, such as triggering one or more RFID scans, in response to the sensor data. For example, in embodiments where the sensor(s) 54 include a door sensor, the controller 46 may be configured to trigger one or more RFID scans in response to a door sensor indicating the door has been closed. In some embodiments, the controller may be configured to trigger scans when the sensor data meets a predetermined condition, such as a predetermined temperature or humidity condition.

The control system 40 may also include at least one location device 57 for generating location data indicative of the location of the mobile RFID container 10. In some embodiments, the location device may use GPS technology and/or cellular technology, e.g., via multilateration of radio signals between radio towers. The location device 57 may be configured to interact with the communications interface 44 to transmit location data directly to the remote device 41, e.g., via a cellular network. Alternatively or additionally, the location device may transmit the location data to the controller 46, and the controller 46 may, in turn, be configured to transmit the location data to the remote device 41 via the communications interface 44. A location device suitable for use in at least some embodiments of the present technology may be embedded in the cellular data card of the wireless communications interface discussed above.

The controller 46 may be configured to store the scan data, sensor data and/or location data in memory carried by the container 10. The controller 46 may further be configured to transmit the scan data and/or sensor data to a remote device. For example, in some embodiments, the controller 46 may be configured to transmit the scan data and/or sensor data at predetermined time intervals and/or in response to predetermined events or conditions. In this regard, the controller 46 may automatically transmit scan data each time a scan occurs, e.g., in response to the container being accessed. The controller 46 may also be configured to transmit data if the controller detects an event that could adversely affect the RFID-tagged items, such as an excessive impact or adverse temperature condition.

In addition, the mobile RFID container 10 may include one or more indicators 55, which can be activated, e.g., by the controller 46 in response to the data collected from the sensor(s) 54 and/or other conditions or parameters. For example, in some embodiments, the indicators 55 may include a visual indicator, such as a light or display screen, that can be activated by the controller 46 to provide alerts and/or messages. In some embodiments, the indicators 55 may also include an audible indicator, such as a speaker, that can be activated by the controller 46 to provide alerts and/or messages. For example, the indicator(s) 55 may be used to provide messages/alerts concerning the conditions of the container and/or its contents. Examples include messages concerning power status, charging status, scanning status, e.g., scan in progress, temperature inside container, critical temperature exceeded, alerts concerning potential damage to products, e.g., resulting from excess temperature, excess impact, or any other desirable information.

The mobile RFID container 10 may include RFID shielding or a portion thereof configured to prevent the RFID detector from reading RFID tags located outside of the container. In this regard, the housing may be constructed of at least one suitable RF blocking material known in the art. Alternatively or additionally, the mobile RFID container 10 may include at least one layer of RFID blocking material that surrounds, encompasses, lines, or interacts with the interior compartment. Suitable RF blocking materials include, for example, a metal, such as copper, aluminum foil, a spray on metallic paint, or a metalized plastic. In some embodiments, the layers of RF blocking material may be, for example, a sheet metal, a metal screen, and/or a metal foam. Alternatively or additionally, a near field (NF) antenna could be employed to limit read distance to inside container 10. The RF signal from RFID reader 50 to RFID antenna 53 could also be tuned to prevent reading of tags outside of the container.

As noted above, a power source 48 is provided for powering the various components of the control system 40. The power source 48 may, for example, include one or more rechargeable batteries 56. The batteries 56 may be removable for charging using an external battery charger, not shown. Alternatively or additionally, the container may include contacts (not shown) for slide-in self-charging or an inductive (contactless) mat charging interface. Alternatively, in some embodiments, the power source 48 may include an AC power adapter 58 configured to power at least one charging circuit (not shown) for charging the batteries, collectively or individually. The AC power adapter 58 may also be configured to directly power the control system components, including while the batteries are being recharged. Electrical power may be delivered to the AC power adapter 58 from an external source. In this regard, a power cord 62 may be used to interconnect the AC power adapter 58 to an external power source. The cord 62 may be configured for connection to an electrical outlet or other power source such as a cigarette lighter in a vehicle. The power cord 62 may be detachable from the AC power adapter 58 so it can be stored when not in use.

The control system 40 may be configured to run in a sleep state to preserve the batteries. For example, the control system 40 may be configured to transition to the sleep state in response to the door 16 being closed for a predetermined amount of time, such as 5 minutes, for example. The control system 40 may be configured to "awaken" to full power operation in response to a predetermined event or condition. For example, when the control system includes a door sensor, the control system may be configured to awaken in response to the door 16 being opened or opened/closed, for example. The control system may further be configured, for example, to perform one or many RFID scans and/or transmit data to the remote device in response to being awakened, e.g., following the door 16 being opened and closed. Alternatively or additionally, the control system 40 may be configured to wake up on regular intervals and perform scans and/or transmit data. For example, the control system may be configured to awaken at regular intervals and transmit location data to the remote device for tracking purposes.

In some embodiments, the mobile RFID container 10 may include a system for limiting and/or tracking access to the container. For example, in some embodiments, the mobile RFID container may include a locking mechanism 59 for restricting access to the container. In addition, the sensors 54 may include one or more identification sensor 61, such as a badge/card reader, finger print reader or similar device. The controller 46 may be configured to control the locking mechanism 59 in response to data collected from the identification sensor 61 indicating that an entity, e.g., person or business, is (or is not) authorized to access the contents of the container. The controller 46 may further be configured to transmit data gathered from the identification sensor to a remote device. For example, in some embodiments, the controller may be configured to record identity information regarding entities who attempt to access contents of the container via the identification sensor and transmit such data (alone or with other data such as contemporaneous scan and/or parameter data) to the remote device.

Figure 3:
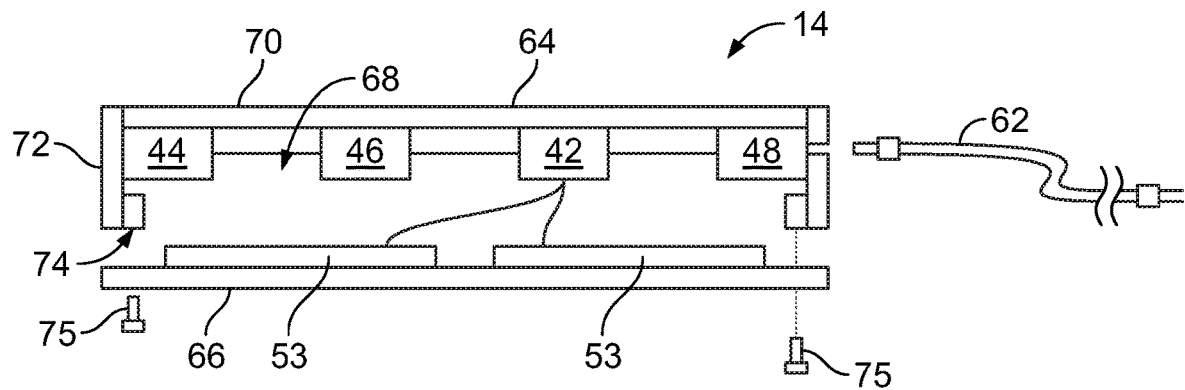
FIG. 3 is an exploded cross-sectional view of the body of the mobile RFID container of FIG. 1.

As shown in FIG. 3, the body 14 of the container may comprise first and second portions 64 and 66 that cooperate to define a compartment 68 for housing at least some of the control system components 40. In the illustrated embodiment, the body first portion 64 may be generally box-shaped and includes a back wall 70 and a side wall 72 extending from the edges of the back wall. It is envisaged that other shapes (rectangular, oval, circular, etc.) can be utilized. The first body portion 64 defines a front opening 74 that provides access to the compartment 68. The second body portion 66 may be in the form of a flat panel that mates with the front opening 74 to close off the compartment 68. Fasteners 75, such as screws, may be used to secure the first and second body portions 64 and 66 to each other. Some or all of the control system components may be mounted on the door 16. In some embodiments, one or more of the RFID detector(s) 42, controller 46, communications interface 44, location device 56 and/or power source 48 may be mounted on, within or in communication with the compartment 68. In some embodiments, some or all of these components may be mounted on a single circuit board. Further, in other embodiments, the antenna(s) 53 may be mounted on the second body portion 66. Alternatively, the antenna(s) 53 may be mounted on the door 16 so that the antenna(s) face the interior compartment 18 when the door is in its closed position. In some embodiments, some or all of the control system components may be carried by the container door 16.

Figure 4:
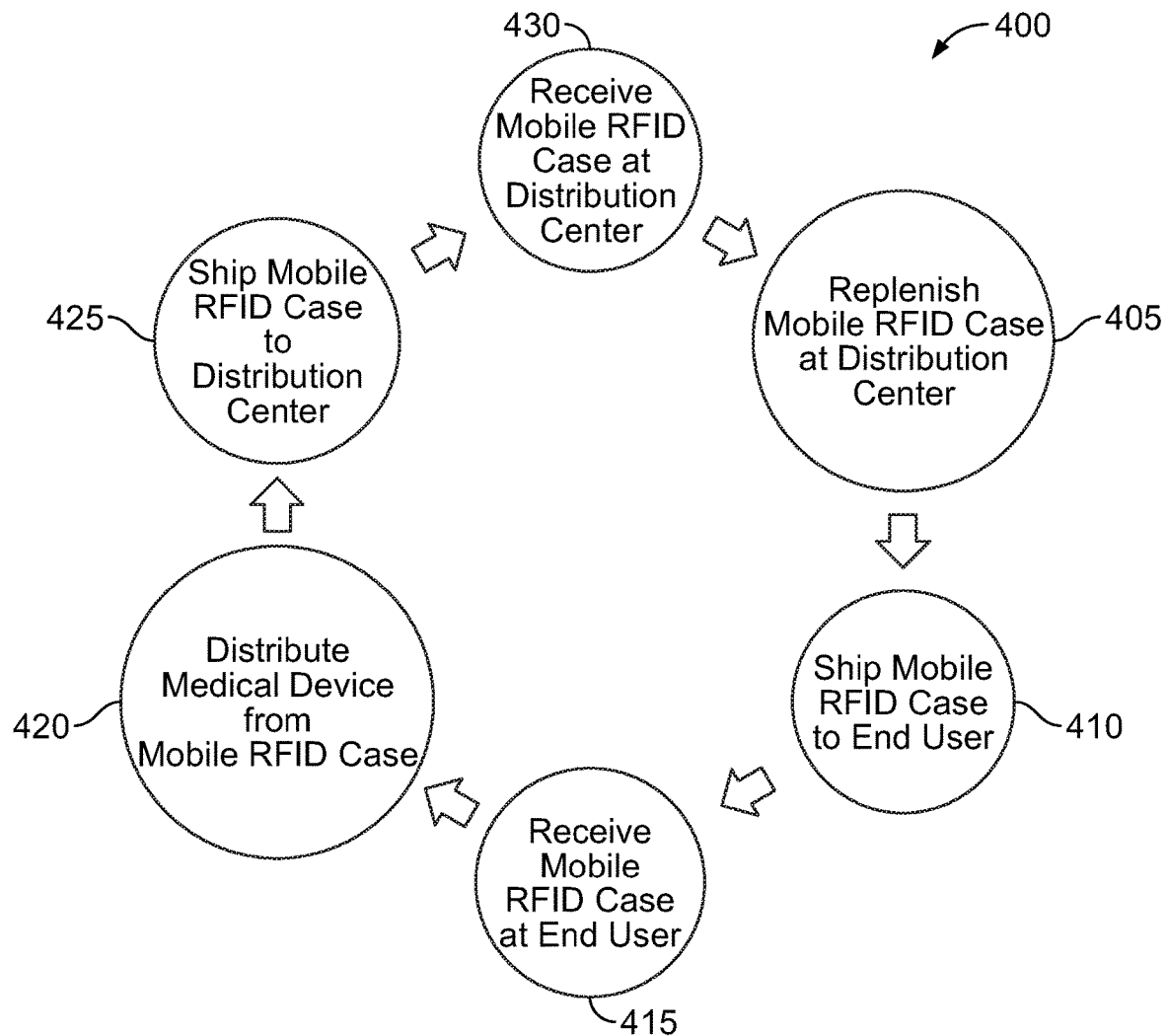
FIGS. 4 and 5 are flow diagrams illustrating a medical device distribution process according to certain embodiments of the present technology.
Figure 5:
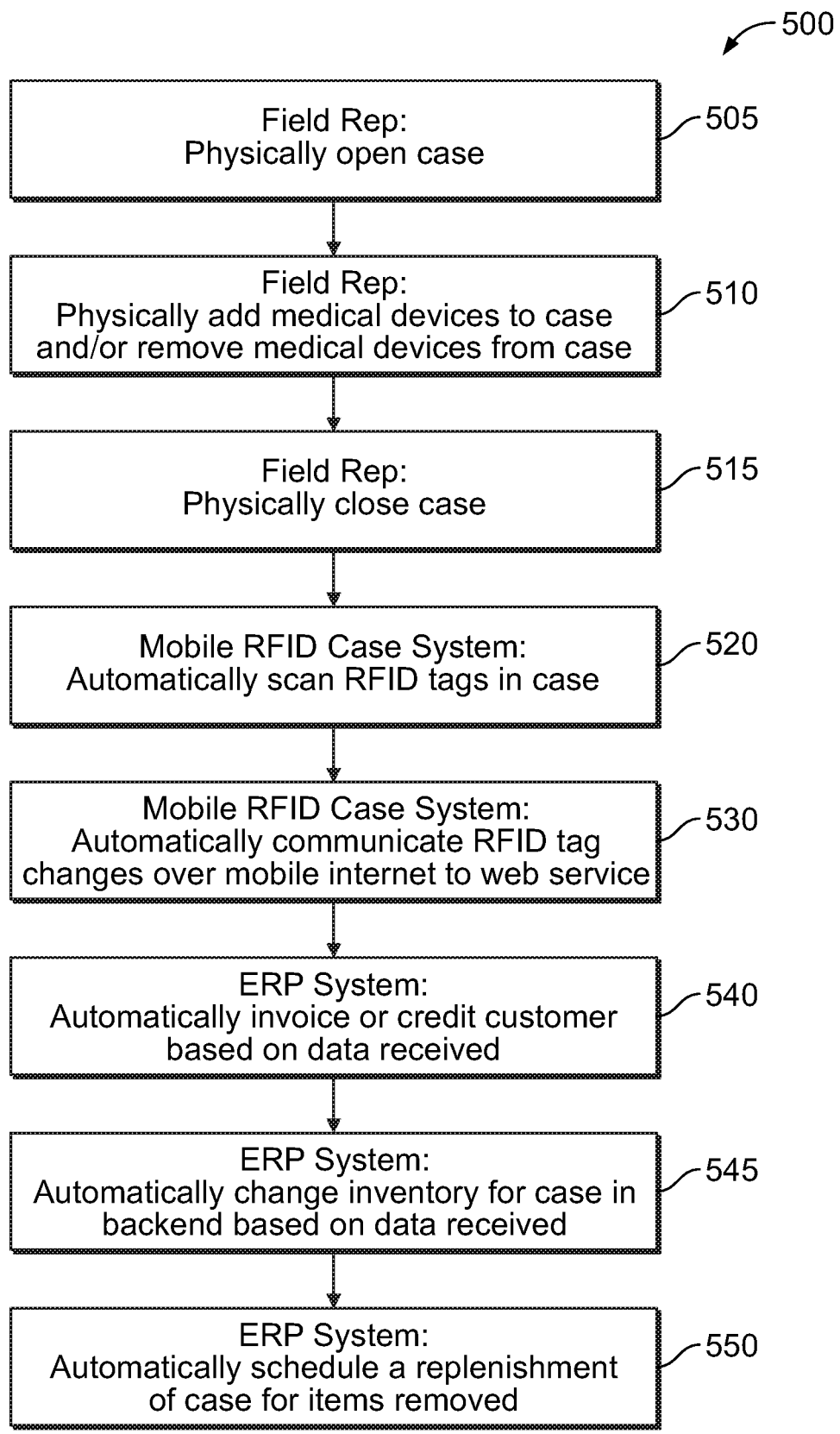

FIGS. 4 and 5 are flow diagrams illustrating an exemplary medical device distribution process according to at least one embodiment of the present technology. The distribution process 400 begins in step 405 where the mobile RFID container 10 is stocked with items at a distribution center. For example, in the context of a medical procedure, the container may be stocked with medical devices of varying sizes and configurations as well as one or more surgical tools that can be used to implant the devices during surgery. After the mobile RFID container 10 is stocked with the appropriate items, the container is closed. At this time, the mobile RFID container 10 may conduct a scan, e.g., in response to sensing door closure via the door sensor and transmit the scan data to the remote device, e.g., an ERP system. At the same time, the mobile RFID container 10 may transmit location data that can be used to correlate the location of the container and its current inventory. For example, the RFID scan data and location data can be used to update inventory data for the mobile RFID container 10. The inventory data may reflect, for example, the time, date, location and contents of the container as well as any other data as may be desirable for the given application.

Once the mobile RFID container 10 is stocked with the appropriate item(s), it is shipped from the distribution center to the end user. (Step 410) In the context of a medical procedure, the end user may be a hospital or surgical center, for example. The mobile RFID container 10 can be shipped via a common carrier, such as Federal Express or UPS, for example. Alternatively, the mobile RFID container 10 may be transported to the end user by a field representative, as is common in the medical device industry.

Once at the end user (Step 415), the mobile RFID container 10 may be used to distribute the RFID-tagged items. (Step 420) By way of example, the mobile RFID container 10 may be brought into the surgical suite by the field representative and used to distribute appropriate items, e.g., implants and/or tools, to the medical staff during a surgical procedure. FIG. 5 is a flow diagram illustrating certain aspects of an exemplary process for distributing items from the mobile RFID container during a surgical procedure. In step 505, the mobile RFID container 10 is opened. For example, the field representative may open the mobile RFID container at the beginning of the surgical procedure or at such time as may be deemed appropriate. Next, in step 510, one or more items are removed from (and/or added) to the container during the medical procedure. For example, several devices, e.g., implants of varying sizes, may be removed from the container. During medical procedure, the appropriate device(s) may be implanted and unused devices may be return to or left in the container. While the container 10 is at the end user, it may perform one or more RFID scans to collect scan data (i.e., RFID tag data) concerning its contents. For example, an RFID scan may be automatically triggered when the door is closed following the medical procedure. (Steps 515 & 520)

The scan data is then transmitted (Step 530) to the remote device 41 where it can be used to generate and/or update appropriate records (e.g., container inventory, discrepancies, locations, restocking, invoicing, other recordable events, etc.). (See, e.g., Steps 540-550). The mobile RFID container 10 may also transmit location data with the scan data to allow the remote device to coordinate the current inventory of the mobile RFID container with its location. For example, the data may be used to determine what items were used during the surgery for invoicing purposes.

As noted above, the remote device 41 may, for example, include an ERP system operating on one or more servers. As indicated in step 540, the ERP system may be configured to automatically invoice or credit customers based on the data received from the RFID container. Similarly, in step 545, the ERP system may be configured to update appropriate inventory records for the specific container based on the data received from the mobile RFID container. Further, in step 550, the ERP system may be configured to automatically schedule replenishment/restocking of the container based on the data received from the mobile RFID container.

Returning to FIG. 4, once the medical procedure is completed, the mobile RFID container 10 may be returned to the manufacturer or distribution center. (Steps 425, 430).

Once at the manufacturer or distribution center, the mobile RFID container 10 may be restocked with the appropriate item(s). (Step 405). Advantageously, the scan data is automatically transmitted to the remote device 41 when the door 16 of the mobile RFID container 10 is closed following the medical procedure. As a result, the appropriate invoicing, inventory and restocking records can be generated before the mobile RFID container 10 is received at the manufacturer or distribution center. Thus, the invoicing process can be expedited, and the manufacturer or distribution center can take steps to ensure that the appropriate items are in inventory for restocking the mobile RFID container 10 upon its receipt at the manufacturer or distribution center.

Other exemplary distributions methods using a mobile RFID container of the type described herein can be found in U.S. patent application Ser. No. 14/325,921, which is entitled "Process For Distribution And Use Of A Mobile RFID Container," and was filed on Jul. 8, 2014, the disclosure of which is hereby incorporated by reference in its entirety.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A mobile container for carrying a plurality of products, each product including at least one RFID tag, the mobile container comprising:
   a housing including a body and a door, the body and the door cooperating to define an interior compartment configured to carry the plurality of products, the door being movable relative to the body between an open position to provide external access to the interior compartment and a closed position to prevent external access to the interior compartment;
   a door sensor configured to detect whether the door is in the open position or the closed position;
   an RFID detector configured to conduct RFID scans of the interior compartment and collect scan data concerning the RFID tags on the products contained within the interior compartment;
   a GPS component configured to generate location data indicative of a location of the mobile container;
   a controller coupled to the door sensor, the RFID detector, and communicatively coupled to the GPS component, the controller configured to trigger an RFID scan via the RFID detector and transmit the scan data and the current location data to a remote device in response to the door sensor detecting that the door has been moved into the closed position.

2. The mobile container of claim 1, wherein the remote device comprises one or more of an enterprise resource planning system, a server, a website, or a computer.

3. The mobile container of claim 1, further comprising a wireless communication interface configured to wirelessly transmit the scan data to the remote device.

4. The mobile container of claim 3, wherein the wireless communication interface comprises one or more of a cellular interface, a Wi-Fi interface, or a Bluetooth interface.

5. The mobile container of claim 1, further comprising radio-frequency (RF) shielding configured to prevent the RFID detector from obtaining RFID scan data from RFID tags located outside of the mobile container.

6. The mobile container of claim 5, wherein the RF shielding comprises at least one of a metal, a metalized paint, or a metalized plastic.

7. The mobile container of claim 5, wherein the RF shielding comprises one of a sheet metal, a metal screen, or a metal foam.

8. The mobile container of claim 1, wherein the RFID detector and the controller are mounted in the door of the mobile container.

9. The mobile container of claim 1, wherein the RFID detector includes:
   at least one antenna; and
   an RFID reader operatively coupled to the at least one antenna, wherein the RFID reader is configured to conduct RFID scans via the at least one antenna.

10. The mobile container of claim 9, wherein the RFID reader is configured to activate the at least one antenna such that the at least one antenna emits a signal at a predefined frequency and generates an electromagnetic field within the interior compartment.

11. The mobile container of claim 10, wherein the at least one antenna comprises a plurality of antennas.

12. The mobile container of claim 1, wherein the scan data comprises data identifying each RFID tag contained in the mobile container.

13. The mobile container of claim 12, wherein the scan data comprises one or more of an EPC code, a TID code, a serial number, a product description, a date, or a lot number.

14. The mobile container of claim 1, wherein the door is movably connected to the body.

15. The mobile container of claim 1, wherein the door is removable from the body.

16. The mobile container of claim 1, wherein the mobile container is in a form that is sized and configured to be carried by an individual.

* * * * *